United States Patent [19]
Verlinden et al.

[11] 3,869,875

[45] Mar. 11, 1975

[54] ICE CHIP OR FLAKE PRODUCING MACHINE

[75] Inventors: Jerry M. Verlinden; Gary D. Swinford, both of Denver, Colo.

[73] Assignee: Mile High Equipment Company, Denver, Colo.

[22] Filed: Mar. 29, 1973

[21] Appl. No.: 346,100

[52] U.S. Cl. .................................................. 62/354
[51] Int. Cl. ............................................. F25c 1/14
[58] Field of Search ............................... 62/354, 320

[56] References Cited
UNITED STATES PATENTS
3,245,225   4/1966   Wallace ................................ 62/320
3,643,454   2/1972   Turner ............................. 62/354 X

*Primary Examiner*—William E. Wayner
*Attorney, Agent, or Firm*—Coffee and Sweeney

[57] ABSTRACT

An ice chip producing machine which includes an elongated cylindrical freezing chamber having one end higher than the other, with means for supplying water to the inside of the chamber. The cylindrical wall of the chamber is cooled to freeze ice on the inside surface thereof. An ice conveying auger is journalled for rotation within the freezing chamber and has a spiral edge disposed in closely spaced relation to the inside wall of the chamber for shearing off ice frozen thereon and carrying the sheared off ice upwardly through the chamber for delivery out of the top thereof. The spiral edge of the auger, in cross section, has a generally double bevelled configuration, with a leading edge portion extending oblique to the inside wall of the chamber, a relieved trailing edge portion and a land portion joining the leading and trailing edge portions and extending generally parallel to the inside wall of the chamber.

8 Claims, 6 Drawing Figures

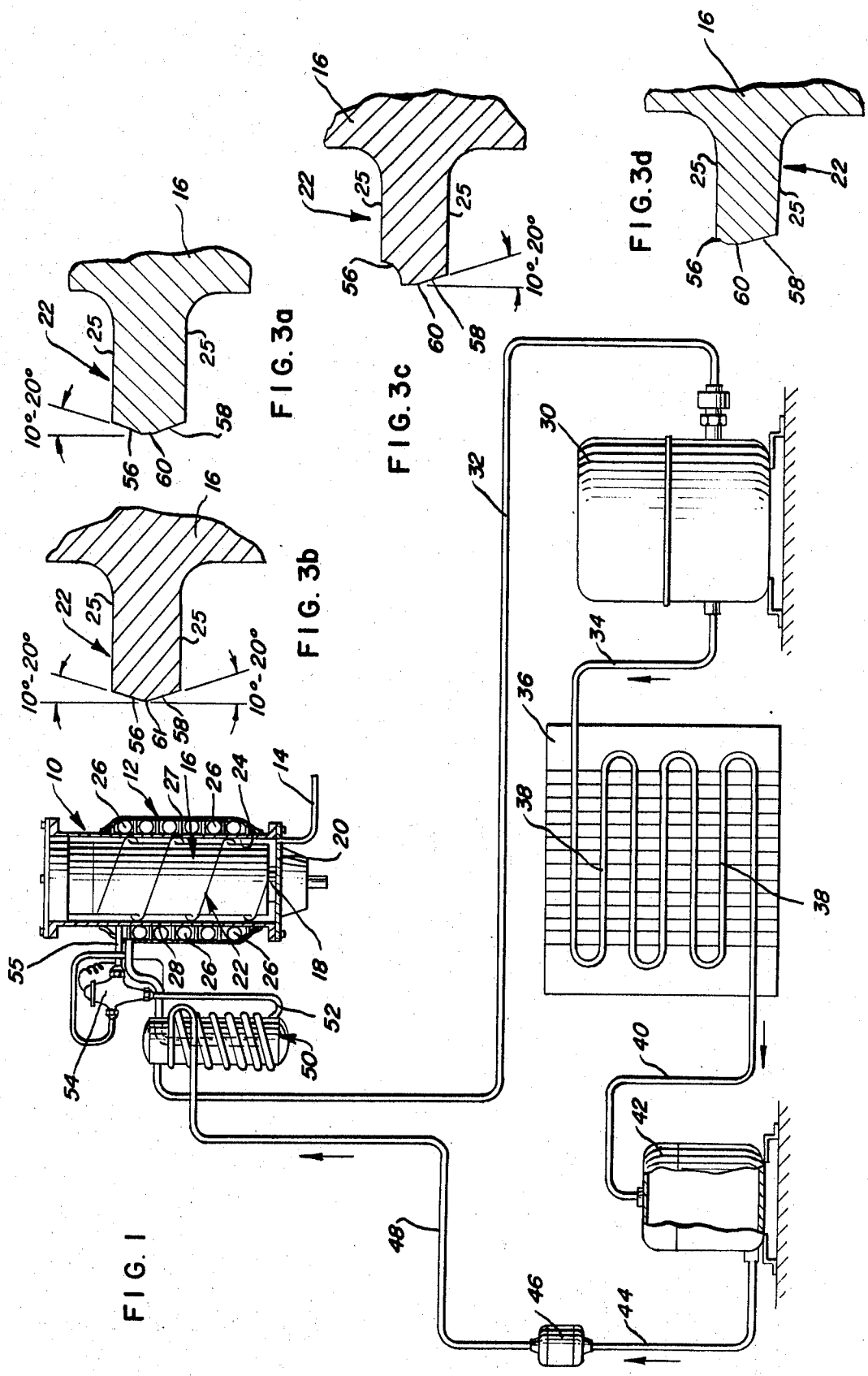

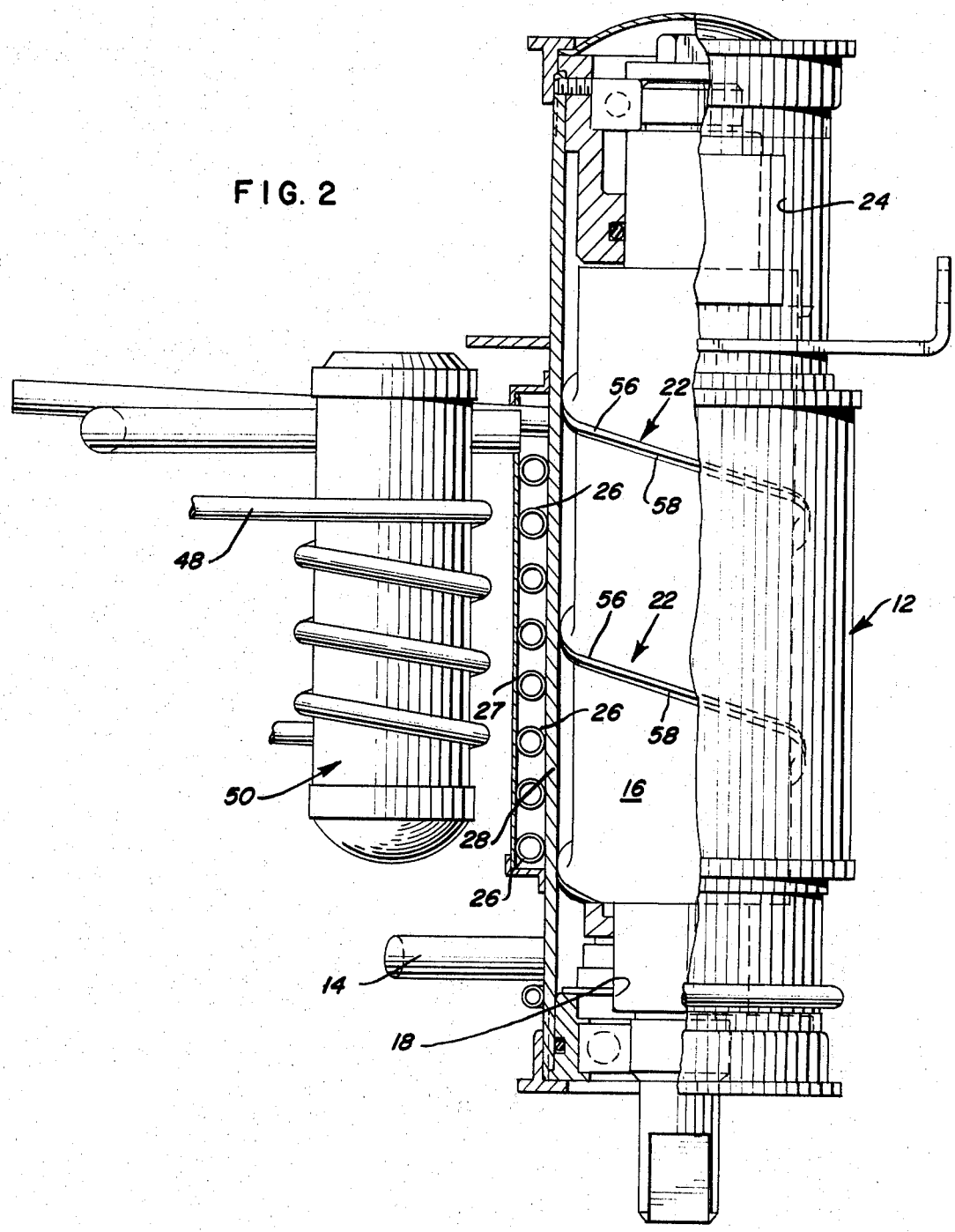

ICE CHIP OR FLAKE PRODUCING MACHINE

BACKGROUND AND SUMMARY OF THE INVENTION

This invention relates to improvements in ice chip producing machines and, particularly, to an auger type machine for producing solid ice chips which have a minimum free water content, the machine having a minimum of clogging at the top thereof.

The main components of a conventional ice chip producing machine include a water reservoir, usually in the form of a freezing cylinder, with a freezing unit in the form of a refrigeration jacket surrounding the cylinder to form ice on the inside walls thereof. Wiper blade means in the form of a delivery auger is rotatably mounted within the cylinder with a wiping edge for moving across the inside walls of the cylinder to cut free the ice flakes as they are formed and move the ice from the cylinder upwardly to a discharge end thereof where the ice chips are discharged from the cylinder.

In operation, such conventional machines preferably feed water into the reservoir from the bottom thereof and permit the water to rise to a selected level whereby the general movement of water and ice formed in the cylinder is directed upwardly. The ice flakes, when removed from the wall of the cylinder by the wiping edge of the auger, will rise to the water surface where they either are spilled over a lip at the top of the reservoir or otherwise skimmed from the reservoir. Heretofore, the ice flakes have had to been removed from the water in a consolidated form, sometimes by an additional freezing action or, in more instances, by lifting the slush ice from the water to permit the water to drain therefrom. In addition to the problem of accumulating too much water at the top of the reservoir whereby the water and ice flakes form a slush, compacting of the ice flakes also is a commonly encountered problem. If the soft ice were to form into a consolidated hard mass, it would clog and bind or even break down the machinery which drives the spiral auger. Several different constructions have been devised to control the amount of water in the delivered consolidation, as well as break up the flow of ice and discharge it from the reservoir.

In one such known device, an inverted cone is mounted over the spiral shaft of the auger above the reservoir level. A cylinder of ice moving upwardly through the reservoir and about the spiral shaft will disintegrate into particles as it moves against the diverging face of the inverted cone. In another arrangement, the cylinder of ice is moved upwardly by the auger against the edge of a fixed plate mounted across the open top of the reservoir. The fixed plate breaks apart the ice column so that the particles or chips of ice may spill over the edge of the reservoir and thence into a container.

In another system exemplified by the patent to Trow et al., U.S. Pat. No. 2,753,694, issued July 10, 1956, a side opening discharge port is provided in the wall of the reservoir near its upper end. With this arrangement, the upper end of the reservoir is closed and the ice moves upwardly and into a chamber above the spiral edge of the auger. The ceiling or top of the chamber is inclined, tilted or otherwise sloped to provide a substantial tilt towards the discharge port to turn the moving ice so that it may flow through the port. The flow of ice through the port then may be directed into a chute to be laterally shifted to a receiving bin alongside the machine.

In all of these systems or arrangements, the ice chip producing machines actually discharge a soft ice from which some of the water has been drained and, thus, the ice chips produced thereby are necessarily a soft, partially consolidated product and usually carry a substantial amount of water. Such chips are considered inferior to ice cubes and solid ice chips, but they are accepted commercially since ice cubes and solid chips are more expensive.

Still another system has been devised for producing more solid, dryer ice chips. Such a system is shown in the patent to Smith U.S. Pat. No. 3,197,974, issued Aug. 3, 1965, which, like the other systems, employs a means extraneous of the auger itself for breaking up the ice chips or sheets delivered by the auger before they are discharged from the machine. In Smith, dimple indentions are formed on the inside of the cylinder above the auger blade to break up the ice.

It has been found through the instant invention that such inverted cones, fixed plates, sloped cylinder tops, dimple indentions, and other extraneous means can be avoided and thereby provide a much simpler and efficient operating machine solely by improving the shape, in cross section, of the spiral edge of the auger which fractures and delivers the ice to the top of the freezing cylinder.

The principal object, therefore, of the present invention is to provide a new and improved auger type ice chip producing machine.

Another object of the invention is to provide a new and improved auger type machine of the character described wherein the spiral edge of the auger is shaped to minimize the water content of the resulting product as well as substantially eliminating compactness of the ice at the top of the cylinder.

In the exemplary embodiment of the ice chip producing machine of the present invention, an elongated cylindrical freezing chamber is provided with one end thereof at a higher elevation than the other end. Means is provided for supplying water to the inside of the freezing chamber, with a refrigeration jacket surrounding the cylindrical freezing chamber to freeze ice on the inside surface thereof. An ice conveying auger is journalled for rotation generally about the central longitudinal axis of the freezing chamber whereby the spiral edge thereof is disposed in closely spaced relation to the inside wall of the chamber to shear off ice frozen thereon and carrying the sheared off ice upwardly through the chamber for delivery out of the top thereof. The spiral edge of the ice conveying auger is shaped, in cross section, to have a generally double bevelled configuration, with a leading edge portion extending oblique to the inside wall of the freezing chamber, and with a relieved trailing edge portion of the spiral auger edge.

It should be understood that the use of the terms "double bevelled configuration" herein is not meant solely in the conventional sense of having both edge portions extending in a straight line at an angle to the inside wall of the freezer chamber. In other words, as specifically shown herein, the leading edge portion or the relieved trailing edge portion may be concave or convex, in cross section, to provide the necessary bevel. Thus, the use of the term double bevelled configuration is contemplated to encompass the leading and trailing edge portions of the auger only to extend at points at angles to the inside wall of the cylindrical chamber.

In certain embodiments of the invention, the leading edge portion and the trailing edge portion are joined by a generally flat land portion of the spiral edge of the auger, the land portion extending generally parallel to the inside wall of the cylindrical chamber.

Other objects, features and advantages of the invention will be apparent from the following detailed description taken in connection with the accompanying drawings.

DESCRIPTION OF THE DRAWINGS

FIG. 1 is a somewhat schematic view of an ice flake or chip producing system showing the refrigeration cycle thereof;

FIG. 2 is a partial vertical section through a freezing chamber and ice conveying auger in accordance with the present invention, incorporated with its surrounding components; and FIGS. 3a through 3d are partial cross sectional views through the spiral edge of various forms of augers in accordance with the present invention.

DETAILED DESCRIPTION OF THE INVENTION

Referring first to FIG. 1, the ice chip or flake producing machine of the present invention includes an elongated vertically oriented cylindrical freezing chamber or reservoir, generally designated 10, which is surrounded by a freezing jacket, generally designated 12, which cools the wall of the freezing chamber to freeze ice on the inside surface thereof. A water inlet 14 leads to the bottom of the chamber. An ice conveying auger, generally designated 16, is journalled as at 18, in the bottom wall 20 of the cylinder 10 for rotation generally about the central longitudinal axis of the cylindrical freezing chamber. The auger has a spiral wiper blade or edge, generally designated 22, which is in closely spaced relation to the inside wall 24 of the chamber 10 and extends upwardly within the chamber or reservoir to wipe the wall at all points therealong and to effect a wiping or shearing action against the wall to fracture the ice thereon when the auger is slowly rotated. The wiper blade protrudes outwardly of the auger by means of a pair of sides 25 disposed transverse to the axis of the auger.

The direction of rotation of the auger is such as to effect an upward translatory movement of ice particles or flakes within the chamber and lift the ice particles or flakes above the surface of the water introduced into the chamber to deliver the ice flakes or chips outwardly from the top of the chamber, as at 24 (FIG. 2). At the same time, water in the ice flakes may flow back into the reservoir to permit the ice particles to congeal into a mass of ice which is continually thrust upwardly from the reservoir by the rotation of the auger.

The refrigeration jacket 12 includes a plurality of refrigeration tubes 26 surrounding the chamber within a shell 27 surrounding an auger housing 28 which defines the cylindrical freezing chamber or reservoir.

The overall system includes a compressor 30 (FIG. 1) to which low pressure gas is fed through line 32. The low pressure gas is converted to high pressure gas, in line 34, which is fed to a condensor 36, the gas passing therethrough within coils 38. The high pressure gas within the coils 38 is passed from the condensor 36 through line 40 in the form of high pressure liquid which passes through a receiver 42 and a line 44 to a dryer 46. The high pressure liquid within line 44, through dryer 46, passes through line 48 to an accumulator and heat exchanger, generally designated 50, whereupon the liquid is cooled and passed through tube 52 to a metering device 54. The metering device controls the passage of the high pressure liquid thereby through tube 55 to the refrigeration tubes 26.

The spiral edge 22 of the auger 16 which wipes and removes the ice flakes or chips from the interior walls 24 of the cylindrical reservoir 10 can take various forms as shown in FIG. 3a through FIG. 3d. In each of the forms shown in said figures, the spiral edge 22 has a "double bevelled" configuration and is provided with a leading edge portion 56 and a relieved trailing edge portion 58. In the forms of the invention shown in FIG. 3a, FIG. 3c and FIG. 3d, the leading and trailing edge portions 56 and 58, respectively, are joined by a land portion 60 which extends generally parallel to the interior walls of the cylindrical chamber 10.

As stated above, the configurations, in cross section, of the spiral edge 22 of the auger 16 in each form of the invention shown in FIGS. 3a–d are generally double bevelled as defined by the leading and trailing edge portions 56 and 58, respectively. It has been proven that such a double bevelled configuration, in cross section, of the spiral edge 22 of the auger, not only greatly reduces the amount of water in the ice product produced by the machine of the present invention but also is very effective to substantially eliminate compactment of the ice mass at the top of the cylinder 10.

Referring to FIG. 3a, the double bevelled edge of the auger is shown to include the leading edge 56 and the relieved trailing edge 58, both of which are shown to extend at substantially the same oblique angles to the inside wall 24 of the cylindrical chamber or reservoir. An angle of about 10° to 20° between the edges 56 and 58 and the interior chamber wall has proven quite effective. The angles of the leading and trailing edge portions need not be equal as long as they are approximately within this angular range. The leading and trailing edges 56 and 58 of the form of the invention shown in FIG. 3a are joined by a generally flat land portion 60 which extends generally parallel to the interior walls 24 of the cylinder 10. The land portion 60 has proven effective having a width of approximately 0.030 inch.

Referring to FIG. 3b, the leading and trailing edges 56 and 58 of the auger 28 are within the aforesaid angular range and intersect each other at a crest 61, without a land (such as land 60), but, again, the leading and trailing edges extend at angles to the interior walls 24 of the cylindrical chamber 10. As shown, the angles are approximately equal.

FIG. 3c shows a form of the invention wherein the relieved trailing edge 58 is generally straight in cross section, but the leading edge 56 is generally concave in cross section but performs the same function as the edges shown in FIGS. 3a and 3b. In this regard, as pointed out in the Summary of the Invention, the terms double bevelled configuration as used herein and in the claims hereof are intended to encompass edges which are not in the technical sense straight edges but which extend at points generally oblique to the inside walls 24 of the cylindrical chamber or reservoir 10. The leading and trailing edges of FIG. 3c are joined by a land 60, as with the form shown in FIG. 3a. A radius of curvature for the concave leading edge 58 of approximately 0.030 inch has proven effective.

FIG. 3d shows a form of the invention wherein the relieved trailing edge 58 is generally straight in cross section, but the leading edge 56 is generally convex in cross section but performs the same function as the edges shown in FIGS. 3a–3c. The leading and trailing edges are joined by a land 60, as with the forms of the invention shown in FIGS. 3a and 3c. A radius of curvature for the convex leading edge of approximately 0.016 to 0.020 inch has proven effective.

With both embodiments shown in FIGS. 3a, 3c and 3d, the leading and trailing edge portions 56 and 58, respectively, preferably are wider than the land portions 60.

The foregoing detailed description has been given for clearness of understanding only and no unnecessary limitations should be understood therefrom as some modifications will be obvious to those skilled in the art.

We claim:

1. In an ice chip producing machine which includes an elongated cylindrical freezing chamber having one end thereof at a higher elevation than the other end, means for supplying water to the inside of said freezing chamber, means for cooling the wall of said freezing chamber to freeze ice on the inside surface thereof, and an ice conveying auger journalled for rotation generally about the central longitudinal axis of the freezing chamber, the auger including a spiral wiper blade which protrudes outwardly of the auger by means of a pair of sides disposed transverse to said axis and which is disposed in closely spaced relation to the inside wall of said chamber to shear off ice frozen thereon and carry said sheared off ice upwardly through the chamber for delivery out of the top thereof, the improvement comprising: said spiral wiper blade of the ice conveying auger being shaped, in cross section, to have a generally double bevelled configuration, with a leading edge portion extending at an angle of approximately 10°–20° to the inside wall of said freezing chamber and a relieved trailing edge portion oblique to the two sides of the wiper blade and the inside wall of said freezing chamber.

2. The ice chip producing machine of claim 1 wherein said leading edge portion and said trailing edge portion are joined by a land portion of the spiral wiper blade of the auger, the land portion extending generally parallel to the inside surface of said chamber.

3. The ice chip producing machine of claim 2 wherein said leading edge portion has a greater width than said land portion.

4. The ice chip producing machine of claim 2 wherein said trailing edge portion has a greater width than said land portion.

5. The ice chip producing machine of claim 4 wherein said leading edge portion has a greater width than said land portion.

6. The ice chip producing machine of claim 1 wherein said leading edge portion and said trailing edge portion are generally of the same width and extend generally at the same angle relative to the inside wall of said chamber.

7. The ice chip producing machine of claim 6 wherein said leading edge portion and said trailing edge portion are joined by a land portion of the spiral wiper blade of the auger, the land portion extending generally parallel to the inside wall of said chamber.

8. The ice chip producing machine of claim 7 wherein said leading and trailing edge portions each have a greater width than said land portion.

* * * * *